United States Patent
Howley et al.

(10) Patent No.: US 7,660,064 B2
(45) Date of Patent: Feb. 9, 2010

(54) METHODS AND APPARATUS FOR CONTROLLING WRITE DRIVER CURRENT

(75) Inventors: James Patrick Howley, Broomfield, CO (US); Michael Philip Straub, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 465 days.

(21) Appl. No.: 11/576,486

(22) PCT Filed: Jan. 11, 2005

(86) PCT No.: PCT/US2005/001096

§ 371 (c)(1),
(2), (4) Date: Apr. 2, 2007

(87) PCT Pub. No.: WO2006/049635

PCT Pub. Date: May 11, 2006

(65) Prior Publication Data

US 2009/0116134 A1 May 7, 2009

Related U.S. Application Data

(60) Provisional application No. 60/623,022, filed on Oct. 28, 2004.

(51) Int. Cl.
*G11B 5/02* (2006.01)
(52) U.S. Cl. ........................................................ 360/68
(58) Field of Classification Search .................. 360/68, 360/39, 46, 66, 71, 67
See application file for complete search history.

(56) References Cited

U.S. PATENT DOCUMENTS

| | | | | |
|---|---|---|---|---|
| 5,993,356 A * | 11/1999 | Houston et al. | | 482/4 |
| 6,927,933 B2 * | 8/2005 | Choi et al. | | 360/68 |
| 7,035,028 B2 * | 4/2006 | Venca et al. | | 360/46 |
| 7,272,032 B2 * | 9/2007 | Tsuji | | 365/158 |
| 7,365,928 B2 * | 4/2008 | Venca et al. | | 360/68 |
| 7,440,208 B1 * | 10/2008 | McEwen et al. | | 360/39 |
| 2007/0260779 A1 * | 11/2007 | Mora et al. | | 710/52 |

* cited by examiner

*Primary Examiner*—Fred Tzeng
(74) *Attorney, Agent, or Firm*—Mendelsohn, Drucker & Associates, P.C.; David L. Cargille; Steve Mendelsohn (57) ABSTRACT

A hard disk drive write driver circuit is described that can change the output impedance of the write driver by use of a lookup table of control values. A control value is selected from the lookup table by using an address based on a dynamic system variable and a program controlled value. The dynamic system variable is converted to a digital representation. The digital representation and a portion of the program controlled value are used as an address to the lookup table to select a control value. The write driver is responsive to the selected control value to control overshoot current. A method to digitally program the output impedance of a preamp write driver based on realistic operating data is also discussed. An additional approach to controlling overshoot current in a write driver through digital control of overshoot duration is also described.

20 Claims, 10 Drawing Sheets

METHODS AND APPARATUS FOR CONTROLLING WRITE DRIVER CURRENT

CROSS REFERENCE TO RELATED APPLICATIONS

The present invention claims the priority of U.S. Provisional Application Ser. No. 60/623,022 filed Oct. 28, 2004 entitled Methods and Apparatus For Controlling Write Driver Current which is incorporated by reference herein in its entirety.

FIELD OF INVENTION

The present invention relates generally to improved methods and apparatus for controlling current in driver circuits and more particularly to advantageous techniques for controlling write current overshoot in hard disk drive write drivers.

BACKGROUND OF INVENTION

Controlling write current overshoot characteristics in hard disk drive (HDD) write drivers is challenging since it depends on many variables. Some variables are dynamic in nature due to changing environment, such as variation in steady state write current and power supply voltage. Other system level variables, such as an output transmission line connecting to a head assembly and head load characteristics, may change significantly in different HDD products.

Varying HDD manufacturer requirements also add to the challenge. Different HDD manufacturers require different relationships between steady state and overshoot currents. Consequently, it is difficult to design a base core of circuitry to be used in multiple products for many customers since different HDD requirements often lead to designs that must be quite different.

Several previous attempts at controlling hard disk drive write currents used analog implementations and analog representations of dynamic variables. Such previous designs used assumptions on system level variables in order to calculate the appropriate write driver output voltage. One of the consequences of these assumptions concerns how the effects of non-ideal system variables, such as transmission line losses can be dealt with in a practical manner. Basing theoretical calculations on assumptions can result in a large margin of error, causing poor performance. Also, analog implementations require more power than complementary metal oxide semiconductor (CMOS) digital implementations and are complex and sensitive, adding time and risk to the process of designing an optimized analog implementation.

SUMMARY OF INVENTION

Among its several aspects, the present invention recognizes there is a need for improved write driver designs that are flexible and easy to configure. The improved write driver designs increase hard disk drive (HDD) manufacturer options and decrease design time and risk associated with customizing a standard core of circuitry to meet requirements of multiple HDDs.

One of the embodiments of the present invention addresses a circuit for controlling the overshoot current in a write driver. An addressable lookup table storage unit is used to hold overshoot control values that affect the write driver overshoot current. The addressable lookup table uses an address made up of a dynamic address portion and a static address portion. The address is used to select an overshoot control value. The write driver selectively controls the write driver overshoot current in response to an overshoot control value. A digital representation of a system variable is provided as an input to the addressable lookup table to provide the dynamic address portion.

Another embodiment of the present invention addresses a circuit to programmably control duration of write driver overshoot control signals instead of programmably varying output impedance in order to achieve a desired peak current.

A further embodiment of the present invention addresses a circuit and method for controlling the overshoot current in a hard disk drive write driver.

A more complete understanding of the present invention, as well as other features and advantages of the invention, will be apparent from the following detailed description and the accompanying drawings.

DETAILED DESCRIPTION

Figure 1A:
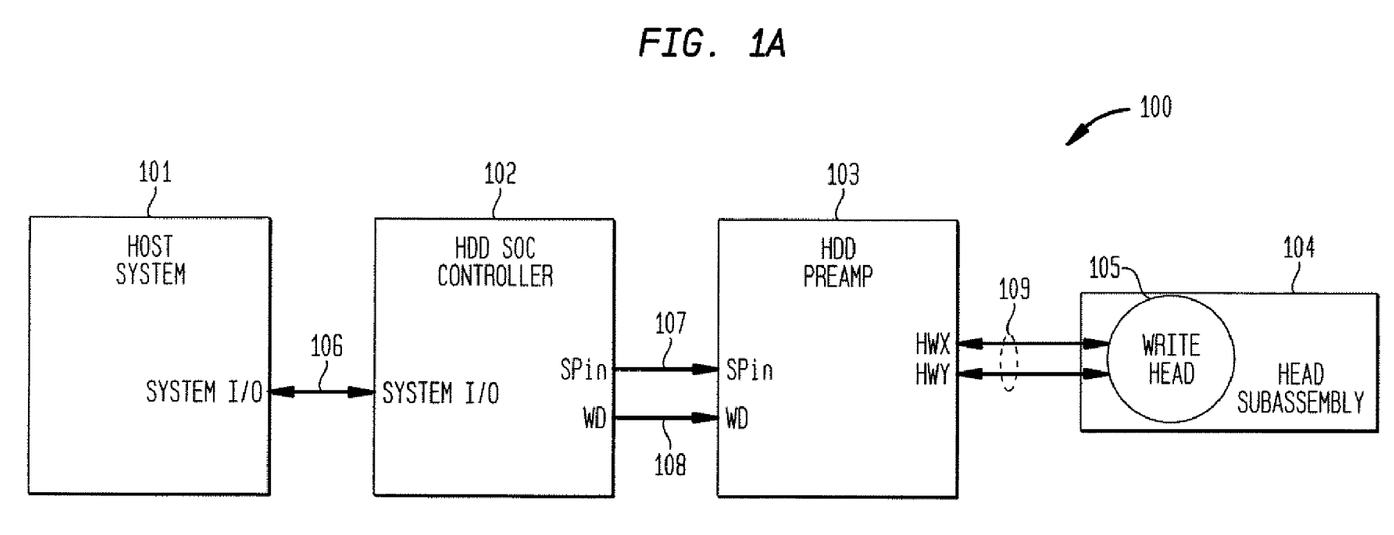
FIG. 1A illustrates a hard disk drive (HDD) digital control system for digitally controlling the overshoot characteristics of a write signal in accordance with the present invention.

The present invention will now be described more fully with reference to the accompanying drawings, in which several presently preferred embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

FIG. 1A illustrates a hard disk drive (HDD) digital control system 100 for digitally controlling the overshoot characteristics of a write signal. The HDD control system 100 includes a host system 101, such as a personal computer, a MP3 player, digital camera, or the like, an HDD system on a chip (SOC) controller 102, an HDD preamp 103, and at least one cable attached head subassembly 104, including an inductive write head 105 and a magnetoresistive read head (not shown). The host system 101 interfaces with the HDD SOC controller 102 over a system input/output (I/O) interface 106, such as an integrated drive electronics (IDE) interface or a small computer systems interface (SCSI) or the like. The HDD SOC controller 102 provides a number of interfaces to the preamp 103, such as a serial interface (SPin) 107 and a write data (WD) signal 108 to control the overshoot characteristics of write signals to the write heads, such as write head 105. The write head 105 is connected to the preamp 103 with a cable 109 containing write drive signals HWX and HWY.

The HDD preamp 103 has two major functions: reading and writing. In reading, HDD systems use a magnetoresistive element that hovers over the rotating magnetic media to read data from the disk. The magnetic media emits a magnetic field due to data previously written to the disk, and the magnetoresistive element is a resistive sensor that changes its resistance value in the presence of the magnetic field. The preamp converts the resistance change seen by the resistive scan into an electrical signal, amplifies it, and sends it to the HDD SOC controller 102 for signal processing.

In writing, HDD systems use an inductive element that hovers over the rotating magnetic media in order to write data to the disk. When current is forced through the inductive element, it creates a magnetic field large enough to overcome the coercivity of the media and polarize the media beneath the head in one of two directions depending on the polarity of the magnetic field. The HDD preamp 103 takes data from the HDD SOC controller 102 that indicates which direction the media should be polarized, converts it to a current that has an appropriate wave-shape characteristic for creating clean magnetic transitions on the media, and forces that current through the inductive write head.

Figure 1B:
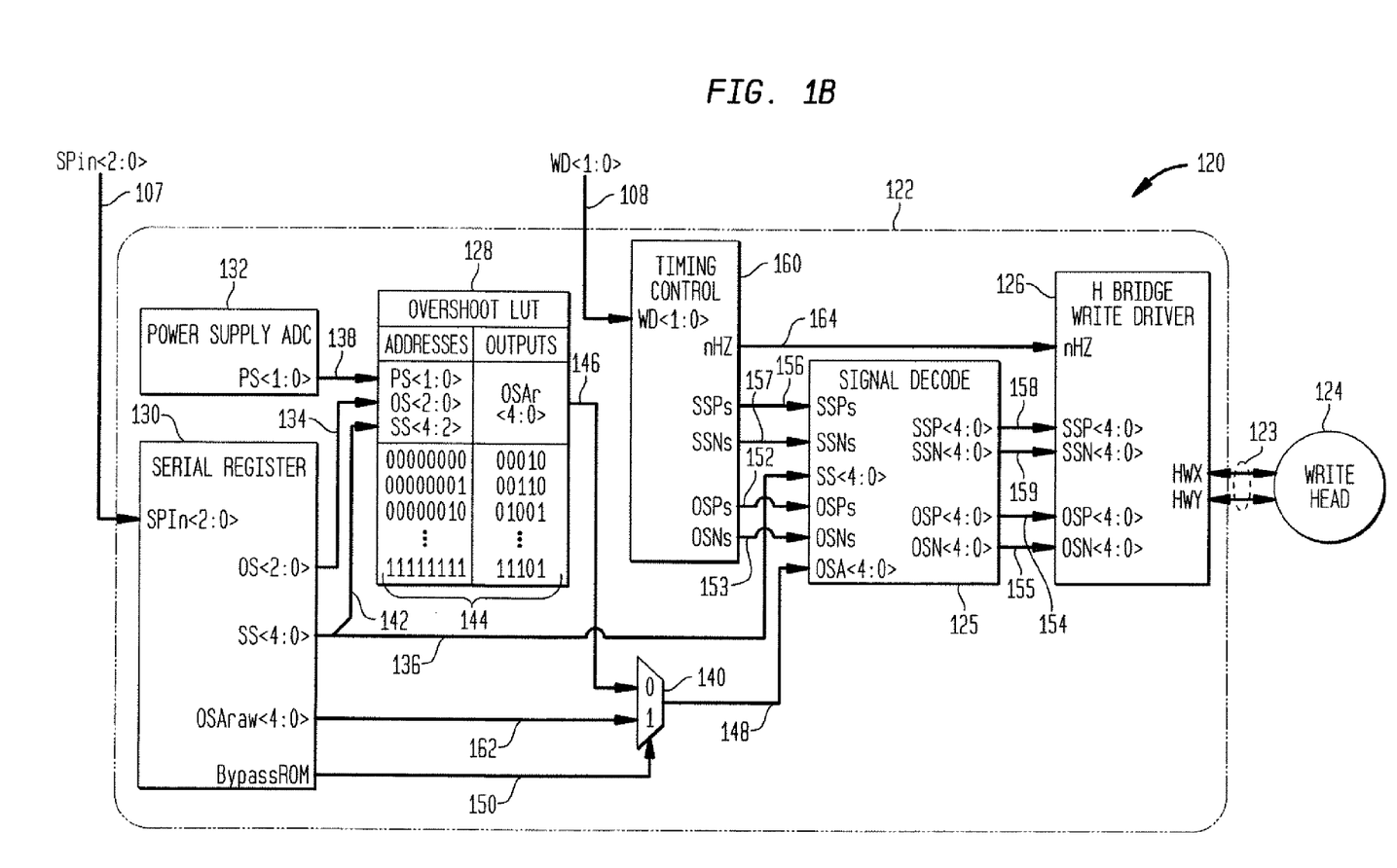
FIG. 1B illustrates a preamp control system with a preamp write subsystem connected to an inductive write head by a head cable in order to control overshoot by use of programmable write driver impedance settings in accordance with the present invention.

FIG. 1B illustrates a preamp control system 120 with a preamp write subsystem 122 connected to a load element, such as an inductive write head 124, by a head cable 123 in order to control overshoot by use of programmable write driver impedance settings. The preamp write subsystem 122 digitally controls the overshoot characteristics of an H bridge write driver 126 based on selectable empirically derived settings stored in a read only memory (ROM) overshoot look up table (LUT) 128.

The preamp write subsystem 122, for the purposes of describing the invention, includes a serial register 130, an HDD power supply analog digital converter (ADC) 132, the overshoot LUT 128, and the H bridge write driver 126. Other circuitry may be included in an HDD preamp, such as read signal acquisition circuitry, which is not shown in FIG. 1B for clarity of illustration of the advantageous overshoot current control circuitry and method. The ROM overshoot LUT 128 stores an empirically derived look up table and produces digital outputs utilized for selecting output impedance values to achieve a desired overshoot characteristic for each control value stored in the overshoot LUT 128. The control values are selected by use of an address that is made up of a static portion and a dynamic portion. The static portion is made up of programmed digital overshoot (OS<2:0>) signals 134 and programmed digital steady state (SS<4:2>) signals 142, a portion of the programmed digital steady state SS<4:0> signals 136. The dynamic portion is provided by (PS<1:0>) signals 138 that are a digital representation of the power supply voltage. The power supply voltage is a system variable that may change over time and with temperature, for example, varying from 4.5 volts to 5.5 volts. The PS<1:0> signals 138 provide a digital representation of up to four ranges of voltage values. For example, three voltage ranges may be 4.5 volts to 4.83 volts, 4.83 volts to 5.17 volts, and 5.17 volts to 5.5 volts, with the fourth range held in reserve or to indicate an out of range voltage value.

The power supply ADC 132 may free run or may provide an output that is updated at pre-defined events that triggers the ADC to sample the power supply voltage, depending upon the application needs. For example, if it is desirable not to affect the write current waveform in the middle of a write operation, a predefined event may be an indication that no write operations are in progress. If the power supply ADC 132 is allowed to constantly sample the power supply voltage it may be preferable to increase the resolution of the ADC output to provide more gradual changes in write current waveforms.

Overshoot data may be collected empirically, through either simulation or bench measurements, across combinations of variables that directly affect circuit operation and output impedance using the actual interconnect cable and head planned for the product or a realistic representation of the same. The collected overshoot data is then correlated with desired current values for an interconnect cable and head load used in a particular HDD. Digital binary values are selected from the correlated data to achieve the appropriate output impedance and overshoot characteristic in the write driver for a particular HDD. The process of selecting the digital binary values based on the collected overshoot data closest to targeted values for each unique combination of variables in order to populate a lookup table is described further below. The selected digital binary values are stored in a digital look up table, such as the ROM overshoot LUT 128, from which they can be selectively applied though multiplexer 140 as inputs to the signal decode unit 125 connected to the write driver 126. It will be appreciated that other technologies can be used for storing look up table values. For example, flash memory might be advantageously applied on a manufacturing line for testing of multiple types of HDDs, where each type of HDD requires a different look up table.

The serial interface (SPin<2:0>) 107 provides programmable serial data to the serial register 130 to convey the overshoot OS<2:0> signals 134, steady state SS<4:0> signals 136, and other information to be used in controlling the preamp H bridge write driver 126. Even though a serial interface is presently preferred, it is appreciated that other interfaces may be used to provide the control information, such as a parallel interface directly providing the required signals. The serial register 130 converts the serialized interface data to parallel form providing the OS<2:0> signals 134 and SS<4:0> signals 136. A power supply analog to digital converter (ADC) 132 provides the digital representation of power supply voltage, PS<1:0> signals 138, that may vary dynamically and are used in creating an address for the overshoot LUT 128.

For the purposes of the illustrative embodiment, the OS<2:0> signals 134 are 3-bits, the SS<4:0> signals 136 are 5-bits, and the PS<1:0> signals 138 are 2-bits. For example, a lookup table address may be created by using SS<4:2> 142, the three most significant bits of the SS<4:0> signals 136, the three OS<2:0> signals 134, and the two PS<1:0> signals 138, to create an eight bit address {SS<4:2> OS<2:0> PS<1:0>}.

The eight bit address is used to access the look up table 144 stored in overshoot LUT 128. The overshoot LUT 128 stores the look up table values in a fixed number of bits, for example, five bits that can be read out on overshoot LUT outputs 146. The overshoot LUT outputs 146 are selected by multiplexer 140 which outputs OSA<4:0> signals 148. The OSA<4:0> signals 148 are gated by signal decode unit 125, and used in the write driver 126 for controlling the selective application of different impedance values to appropriately control the overshoot characteristics of the write driver. It is noted that the number of ROM overshoot LUT output bits can vary depending upon the resolution required to achieve the desired overshoot characteristics. The multiplexer 140 selects the overshoot LUT outputs 146 by use of a bypass ROM signal 150 for an operational mode where the overshoot LUT 128 is not bypassed.

The 5-bit steady state SS<4:0> signals 136 are also sent to the signal decode unit 125. Depending upon the write driver and the accuracy required, all five steady state bits may not be required. By way of example, three of the five available bits may be all that is necessary to obtain the desired control of the steady state current in the write driver. The overshoot LUT values are chosen to maintain a desired relationship between overshoot and steady state current through the load. It is also noted that the overshoot LUT 128 can be set up to support multiple HDDs where each supported HDD requires a different set of overshoot data.

The multiplexer 140 five bit output OSA<4:0> signals 148 are gated in the signal decode unit 125 subject to control by an OSPs signal 152 and an OSNs signal 153 which results in the generation of OSP<4:0> signals 154 and OSN<4:0> signals 155, respectively. The five SS<4:0> signals 136 are gated in the signal decode unit 125 by SSPs signal 156 and SSNs signal 157 and result in the generation of SSP<4:0> signals 158 and SSN<4:0> signals 159, respectively. The OSPs signal 152, the OSNs signal 153, the SSPs signal 156, and the SSNs signal 157 are generated by a timing control circuit 160 to appropriately enable and disable the OSA<4:0> signals 148 and the SS<4:0> signals 136 during an overshoot time period. The timing of these signals is discussed further below.

Figure 1C:
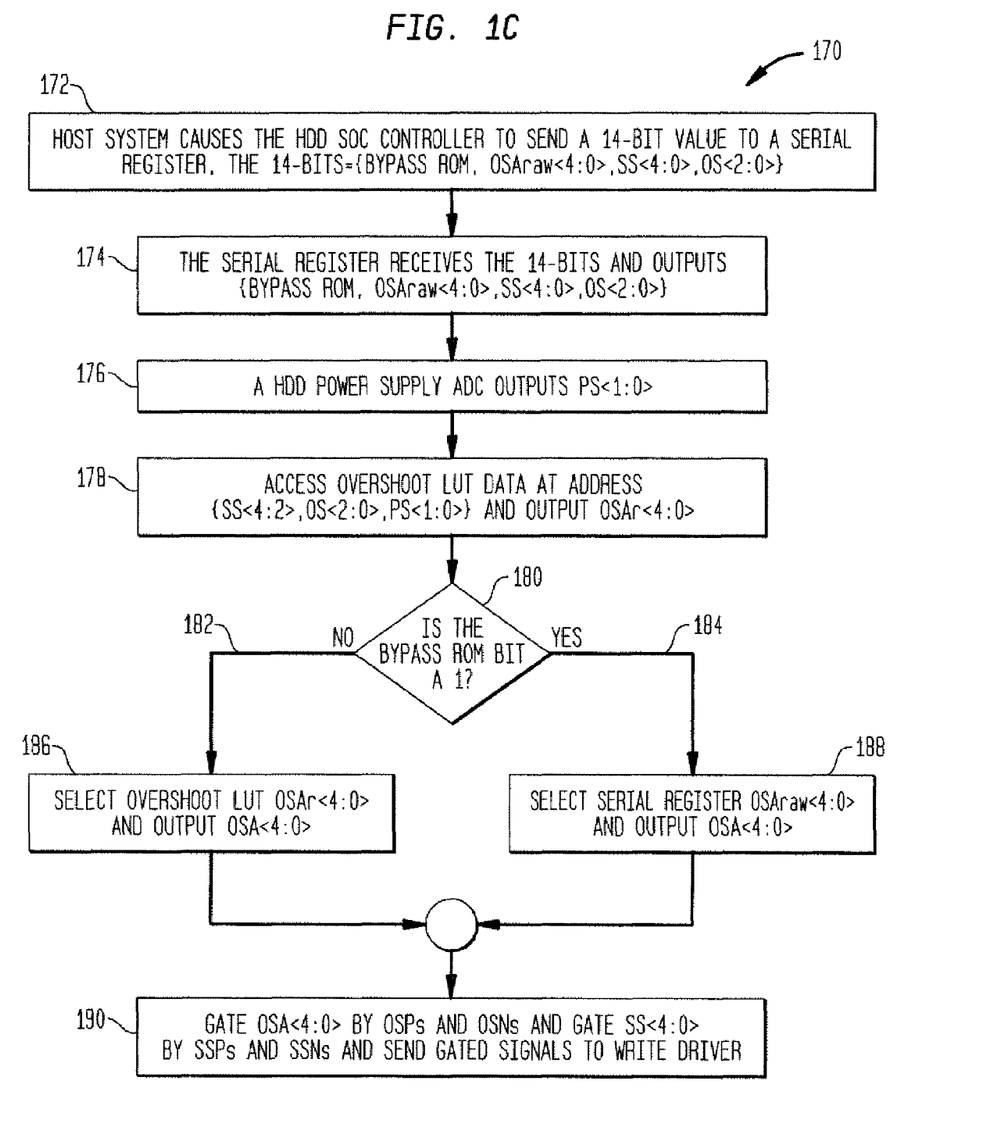
FIG. 1C illustrates a process to control the overshoot characteristics of a write driver based on selectable empirically derived settings stored in a ROM in accordance with the present invention.

FIG. 1C illustrates a process 170 to control the overshoot characteristics of a write driver based on selectable empirically derived settings stored in an overshoot LUT in accordance with the present invention. In a first step 172, the host system 101 causes the HDD SOC controller 102 to send a 14-bit value to the serial register 130. The 14-bit value is {bypass ROM, OSAraw<4:0>, SS<4:0>, OS<2:0>}. In the next step 174, the serial register 130 receives the 14-bits and outputs {bypass ROM signal 150, OSAraw<4:0> 162, SS<4:0> 136, OS<2:0> 134}. In step 176, the power supply ADC 132 outputs PS<1:0> signals 138 as a digital representation of the power supply voltage. In step 178, the overshoot LUT 128 is accessed at address {SS<4:2>, OS<2:0>, PS<1:0>} and outputs the data at the applied address on OSAr<4:0> signals 146. In step 180, the bypass ROM signal 150 is tested for a 0 indicating a no bypass condition 182 and a 1 indicating a bypass condition 184. In step 186, the multiplexer 140 selects the overshoot LUT 128 output OSAr<4:0> signals 146 for the no bypass condition 182. In step 188, the multiplexer 140 selects the overshoot serial register OSAraw<4:0> signals 162 for the bypass condition 184. In step 190, the multiplexer output OSA<4:0> signals 148 are gated by OSPs 152 and OSNs 153 in the signal decode unit 125 and SS<4:0> signals 136 are gated by SSPs 156 and SSNs 157 in the signal decode unit 125. The gated signals OSP<4:0> 154, OSN<4:0> 155, SSP<4:0> 158, and SSN<4:0> 159 are sent to the write driver 126.

Figure 2:
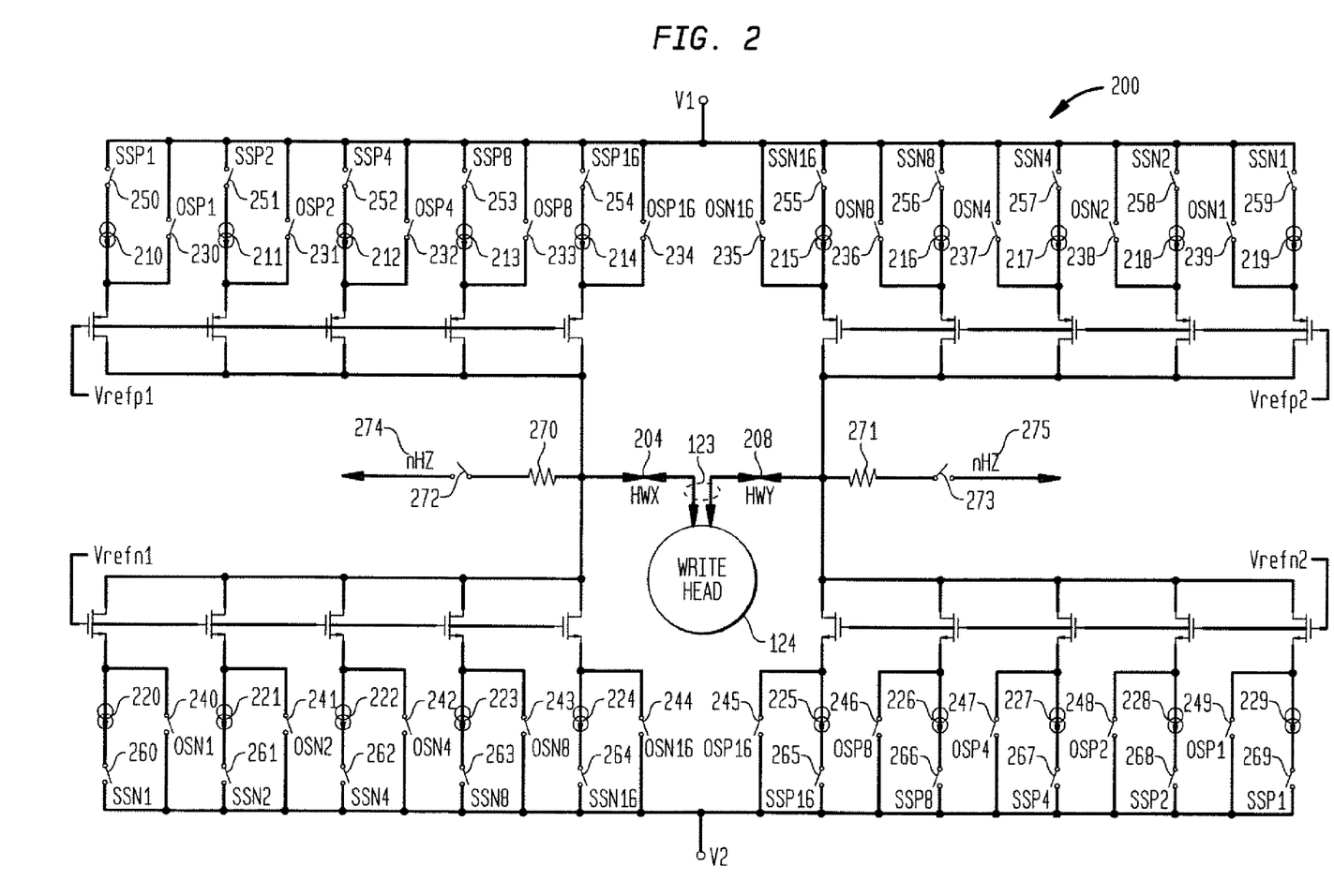
FIG. 2 illustrates an exemplary H bridge write driver for a cable attached write head with programmable overshoot and steady state control in accordance with the present invention.

Various programmable write driver circuits may be used, since the technique of generating the steady state values and overshoot values is based on experimental and simulation models using real hardware or realistic representations of such hardware. For example, FIG. 2 illustrates an exemplary H bridge write driver 200 for a cable attached write head with programmable overshoot and steady state control. The current in the H bridge write driver 200 flows through the load pins HWX 204 and HWY 208 either in a positive direction or negative direction. The load pins HWX 204 and HWY 208 are connected to the HDD write head 124 through a cable 123. A typical head load can be represented by a 4-8 nH inductor in series with an 8 ohm resistor connected to the write driver through a transmission line cable with cable characteristics of Zo=60 ohms, Td=200 psec. Since both the write head 124 and the interconnecting cable 123 can vary by a large amount with significant non-ideal characteristics, actual cables and heads planned for use in an HDD product are used in formulating the lookup table values.

For the H bridge write driver 200, steady state current is programmed by selecting a current source value using current sources 210-229 in the steady state (SS) legs of the H write driver. The current sources 210-229 have binary weighted values and each current source is either enabled or disabled with a series switch, such as the SSP and SSN switches 250-269. The steady state write current is programmable by enabling different legs of the H bridge write driver 200. The overshoot is programmed by setting a binary weighted on resistance using the overshoot switches 230-249 to enable different legs of the H bridge write driver 200.

To control the steady state current and overshoot characteristics when driving the write head, digitally controlled circuit switches are used. In both positive and negative current flow cases, the H write driver operates in an overshoot mode and in a steady state mode. For positive current flow and based on the multiplexer 140 output OSA<4:0> signals 148, selected OSP switches 230-234 and 245-249 and the SSP switches 250-254 and 265-269 are enabled during overshoot and steady state, respectively. For example, a multiplexer 140 output of OSA<4:0> signals 148 of <11001> would, when gated by the OSPs 152 timing signal, enable OSP switches OSP16 234, OSP8 233, and OSP1 230. For negative current flow and based on the multiplexer 140 output of OSA<4:0> signals 148, the OSN switches 235-244 and the SSN switches 255-264 are enabled during overshoot and steady state, respectively.

Figure 3:
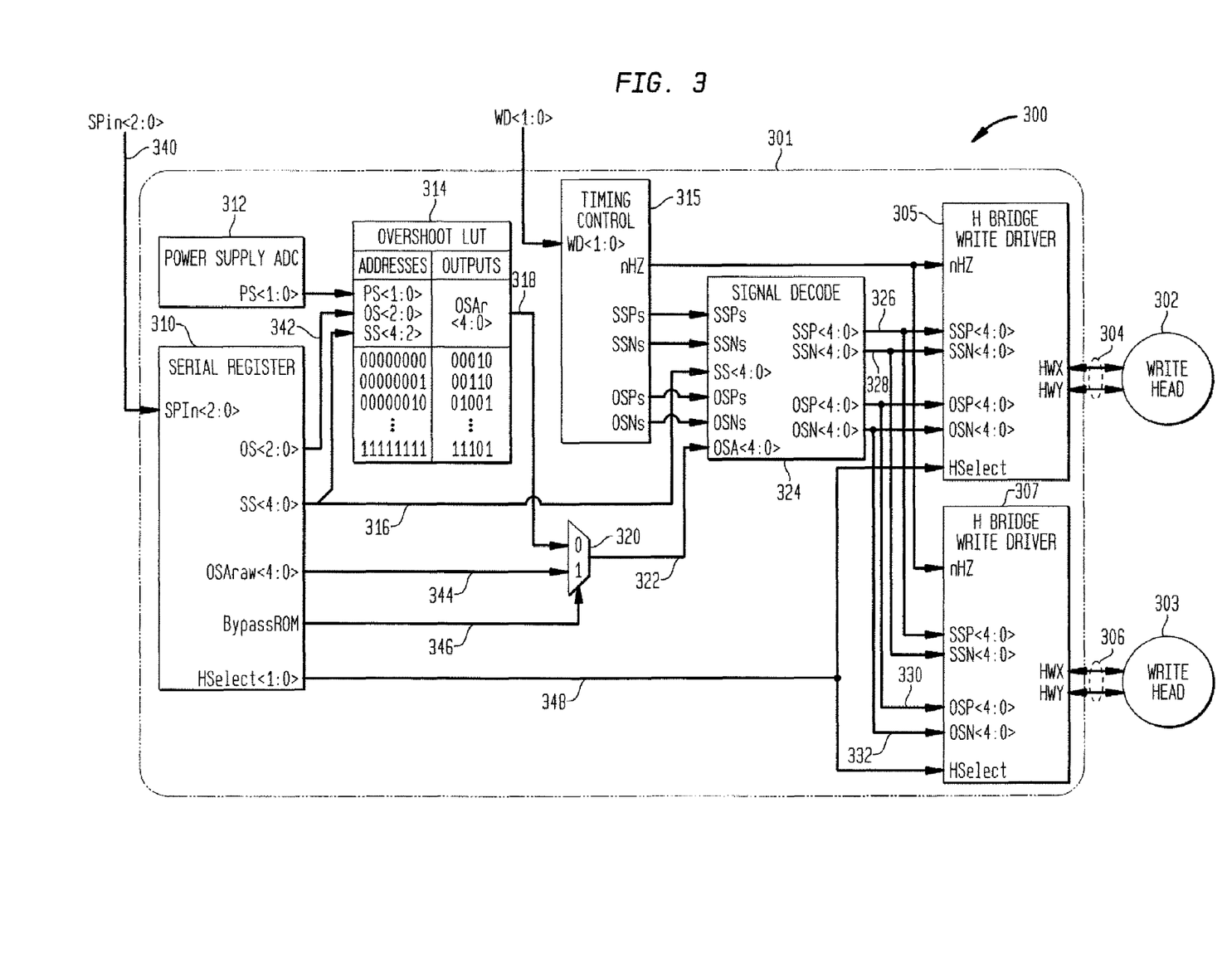
FIG. 3 illustrates an example of a preamp control system for two heads in an HDD in accordance with the present invention.

FIG. 3 illustrates an example of a preamp control system 300 with preamp 301 for two write heads 302 and 303 in an HDD. Write head 302 is connected via cable 304 to H bridge write driver 305. Write head 303 is connected via cable 306 to H bridge write driver 307. There is a separate write driver, such as H bridge write driver 200, for each head but only a single serial register 310, HDD power supply ADC 312, overshoot LUT 314, timing control circuit 315, and signal decode unit 324 are utilized to support both write heads 302 and 303.

The serial interface (SPin<2:0>) 340 provides programmable serial data to the serial register 310 to convey overshoot OS<2:0> signals 342, steady state (SS<4:0>) signals 316, and other information, such as OSAraw<4:0> signals 344, bypass ROM signal 346, and head select (HSelect<1:0>) signal 348, to be used in controlling the preamp H bridge write drivers 305 and 307. The HSelect signal 348 enables write head operation. The overshoot LUT 314 provides the OSAr<4:0> signals 318 to multiplexer 320. The multiplexer 320 output OSA<4:0> signals 322 are shared for all write head H bridge write drivers. For example, the five binary output values of OSAr<4:0> signals 318 of the overshoot LUT 314, as selected output OSA<4:0> signals 322 of multiplexer 320 are gated in the signal decode unit 324. The OSA<4:0> signals 322 and SS<4:0> signals 316 are gated with the appropriately timed signals from the timing control circuit 315 to generate SSP<4:0> signals 326, SSN<4:0> signals 328, overshoot OSP<4:0> signals 330, and OSN<4:0> signals 332 needed in each head's H bridge write driver 305 and 307. For example, OSP<2>=OSA<2>∧OSPs and SSN<4>=SS<4>∧SSNs, where ∧ is a logical AND function.

Figure 4:
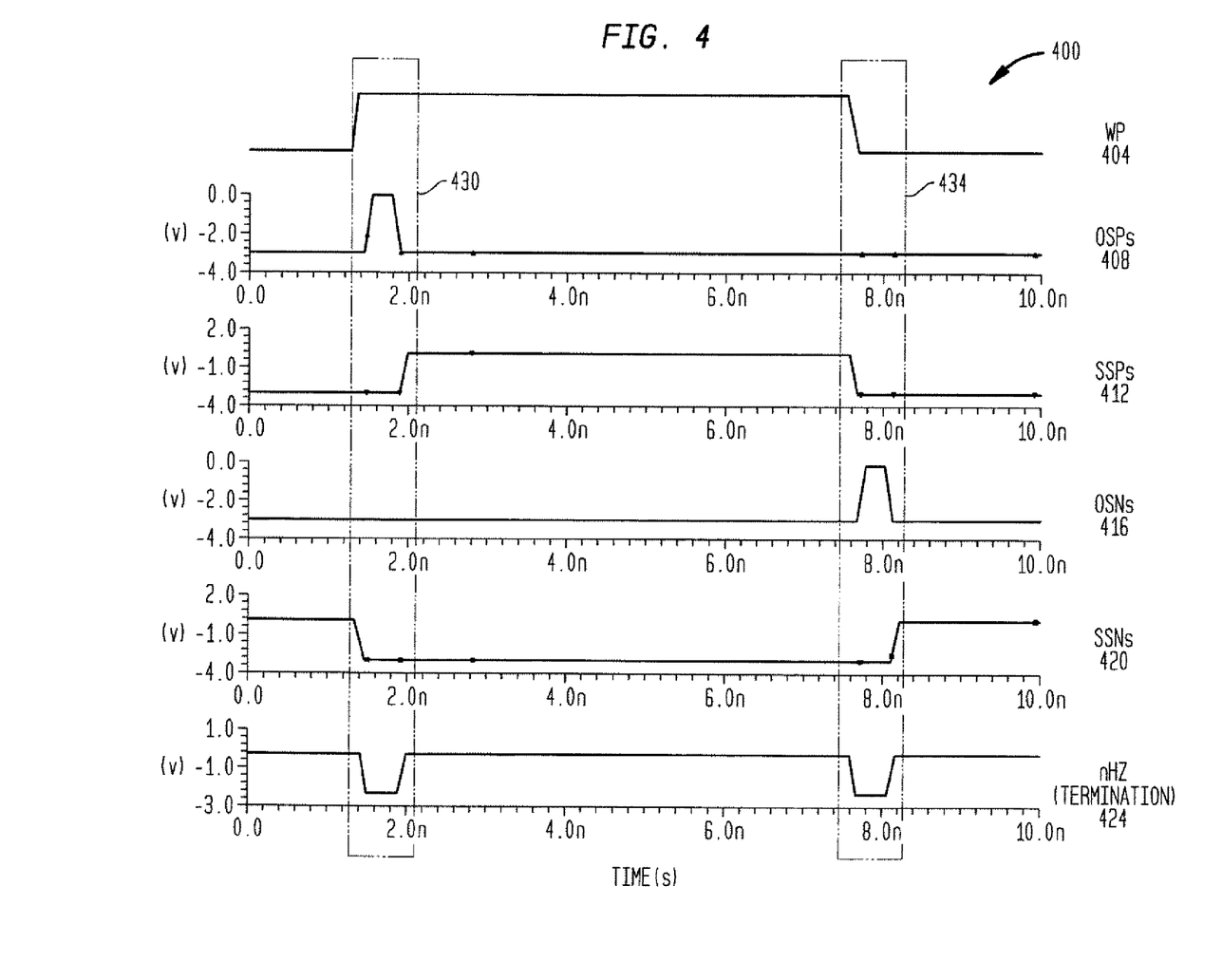
FIG. 4 illustrates a head write driver timing diagram showing relative timing of overshoot switches and steady state switches in accordance with the present invention.

FIG. 4 illustrates a head write driver timing diagram 400 showing the relative timing during a write operation. The WD<1:0> signals 108 of FIG. 1B are differential signals which are subtracted, WD<1>−WD<0>, to create a WP signal 404. When the WP signal 404 is active high, positive current flows through the head load. The timing control circuit 160 of FIG. 1B generates gating signals OSPs 152, OSNs 153, SSPs 156, SSNs 157, and nHZ 164 with the timing shown in FIG. 4 for OSPs 408, OSNs 416, SSPs 412, SSNs 420, and nHZ 424, respectively. The overshoot switch positive OSP<4:0> signals 154 are gated by the OSPs 152 signal with the timing shown for OSPs 408 in FIG. 4. The overshoot switch negative OSN<4:0> signals 155 are gated by the OSNs 153 signal with the timing shown for OSNs 416 in FIG. 4. In a similar manner, the steady state switch positive SSP<4:0> signals 158 are gated by the SSPs signal 156 with the timing shown for SSPs signal 412 in FIG. 4. The steady state switch negative SSN<4:0> signals 159 are gated by the SSNs signal 157 with the timing shown for SSNs signal 420 in FIG. 4. A high level indicates the switch is conducting, a low level indicates the switch is open or high impedance.

In the overshoot mode, the termination resistances 270 and 271 of FIG. 2 are switched out, under control of the nHZ signals 274 and 275 which open switches 272 and 273. The timing of the nHZ signals 274 and 275 is shown for nHZ signal 424 in FIG. 4. During overshoot time period 430, the steady state current sources 210-229 of FIG. 2 are all turned off by setting the SSP and SSN switches 250-269 open with the timing of signals SSPs 412 and SSNs 420. Also, during this overshoot time period 430, selected overshoot switches are turned on. In positive overshoot operation during time period 430, selected OSP switches from the set of OSP switches {230-234, 245-249} are turned on by gating signal OSPs 408. In negative overshoot time period 434, selected OSN switches from the set of OSN switches {235-244} are turned on by gating signal OSNs 416. The OSP and the OSN switches are connected to gated outputs from a ROM lookup table circuit, such as outputs from the overshoot LUT 128 of FIG. 1B, when selected through multiplexer 140.

After the overshoot time period 430, the circuit enters a steady state mode of operation in which the termination resistances 270 and 271 are switched in, under control of the nHZ signals 274 and 275, as indicated with a high level on nHZ signal 424 of FIG. 4, which closes switches 272 and 273. The overshoot switches 230-249 are all turned off, placing the switches in a high impedance state, with a low level on the gating signals OSPs 408 and OSNs 416 during steady state. After the overshoot time period, selected steady state switches are turned on. In positive steady state operation, selected SSP switches from the set of SSP switches {250-254, 265-269} are turned on with the timing of gating signal SSPs 412. In negative steady state operation, selected SSN switches from the set of SSN switches {255-264} are turned on with the timing of gating signal SSNs 420.

Figure 5A:
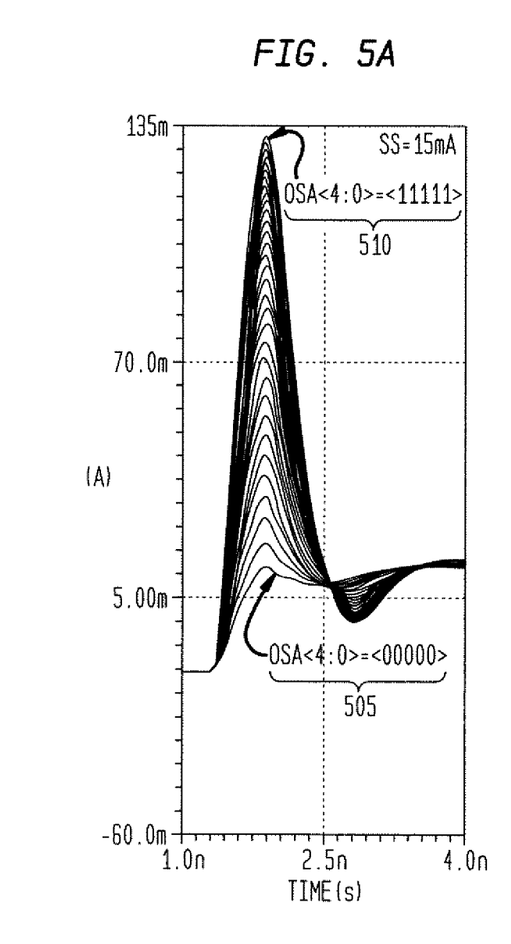
FIGS. 5A, 5B, and 5C illustrate write current waveforms for different values of write driver output impedance for three different steady state (SS) current settings, 15 mA for FIG. 5A, 40 mA for FIG. 5B, and 60 mA for FIG. 5C, from which overshoot lookup table values are selected in accordance with the present invention.
Figure 5B:
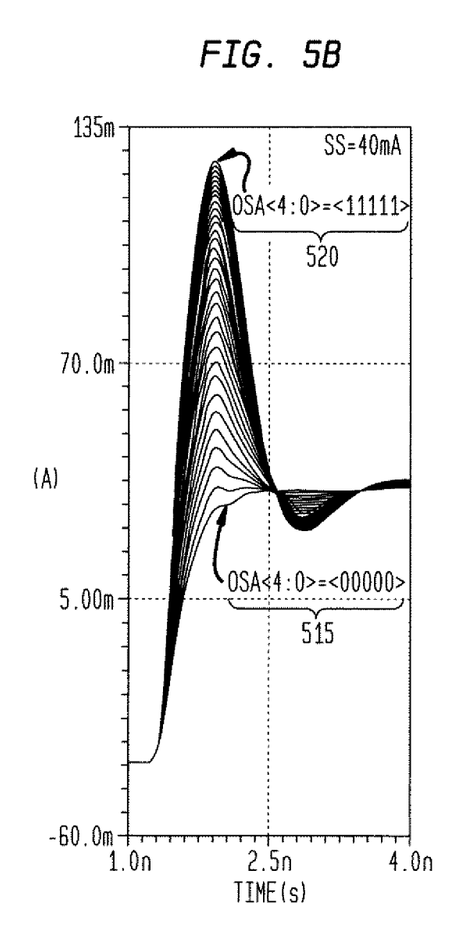
Figure 5C:
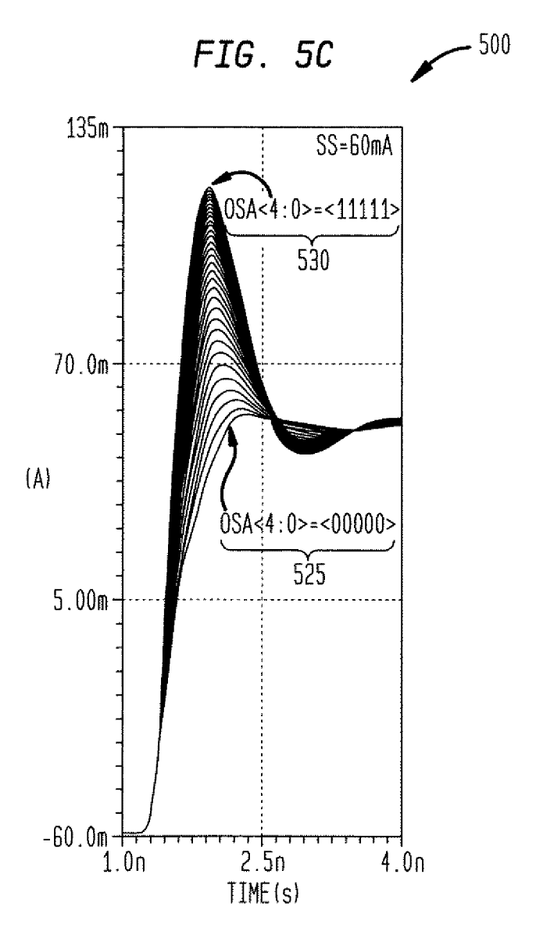

FIGS. 5A, 5B, and 5C illustrate write current waveforms for different values of write driver output impedance for three different steady state (SS) current settings and at a particular power supply voltage setting. It is noted that the peak overshoot current is affected by the SS setting. For example, FIG. 5A shows thirty two curves with the lowest curve 505 due to an OSA setting of OSA<00000>, the highest curve 510 due to an OSA setting of OSA<11111>, and uses an SS setting of 15 mA for all curves. FIG. 5B shows thirty two curves with the lowest curve 515 due to an OSA setting of OSA<00000>, the highest curve 520 due to an OSA setting of OSA<11111>, and uses an SS setting of 40 mA. FIG. 5C shows thirty two curves with the lowest curve 525 due to an OSA setting of OSA<00000>, the highest curve 530 due to an OSA setting of OSA<11111>, and uses an SS setting of 60 mA. A similar set of waveforms is created for all steady state and power supply voltage combinations and these waveforms represent all the choices available for programming the ROM overshoot LUT. It is from these curves that the overshoot lookup table values are selected. The selection of the overshoot lookup table values is dynamically affected by the power supply voltage, represented by the PS<1:0> signals 138 of FIG. 1.

To obtain the data to load into an overshoot ROM, such as the ROM overshoot LUT 128, the following procedure, for example, may be used. First, empirical data for a particular cable and head assembly is gathered that will be used in populating the lookup table. This step is accomplished by performing overshoot mode output impedance sweeps for every combination of steady state current value and power supply voltage value, as represented by SS<4:0> signals 136 and PS<1:0> signals 138, respectively. The output impedance binary controlling values of the programmable write driver are supplied by multiplexer 140 which uses a bypass ROM signal 150 being active to select OSAraw<4:0> signals 162 instead of the OSAr<4:0> signals 146 from the ROM overshoot LUT 128. A sweep is accomplished by selecting a steady state current as represented by the SS<4:0> signals and a power supply voltage as represented by the PS<1:0> signals, varying the OSAraw<4:0> signals and recording the affects on the H bridge write driver current waveform, such as recording the peak overshoot current values. This can either be done in simulation, or on the bench, or both. In both cases, there are hooks that allow the lookup table to be bypassed, for example, the multiplexer 140 selecting the OSAraw<4:0> signals 162 with a high on bypass ROM signal 150, and thereby affect the output impedance of the H write driver by a path independent of the ROM overshoot LUT.

By following this procedure for different steady state currents and different power supply voltages, an overshoot characteristic database is created. FIGS. 5A, 5B, and 5C represent examples of sweeps from which overshoot data can be obtained and included in the database. For a circuit supporting five steady state SS<4:0> signals and two power supply signals PS<1:0>, there are 128 combinations of settings that are evaluated for up to 32 overshoot settings using the five bit OSAraw<4:0> signals for overshoot control. Such a system generates up to 128×32=4096 overshoot waveforms to be obtained and included in the database. Based on this database, data equations may be generated representing peak overshoot current in terms of Iw and OSAraw settings for each power supply voltage range. The use of equations may be advantageous to reduce the simulation or evaluation time to gather data for all cases. It is also noted that depending upon the application, the number of SS settings that need to be evaluated may be reduced, for example, from five bits to three bits as based on the SS<4:2> signals 142 used as part of the overshoot LUT 128 addresses.

Next, a table of two columns is created, where one column contains binary codes that represent all of the possible SS<4:0>, PS<1:0>, and OS<2:0> combinations, and the other column contains the desired, or targeted, overshoot current value for each corresponding input combination located in the first column.

For each setting of the steady state SS<4:0> signals, power supply voltage PS<1:0> signals, and OSAraw<4:0> signals, there is a measured overshoot current value. For each setting of the steady state SS<4:0>, power supply voltage PS<1:0>, and OS<2:0> signals there is a desired overshoot current value. Using this known information, a search is made through the database for the output impedance setting of the OSAraw<4:0> signals, that will yield the overshoot current value that is closest to the desired value. Not all combinations of input values in the database may be acceptable for proper circuit operation. For example, at a high power supply voltage range and a high steady state current setting, there may be only a few overshoot settings that are acceptable for a particular H bridge write driver, write head and cable assembly. Only the acceptable settings become candidate settings to program the overshoot LUT, though these settings may support a broad range of overshoot current values depending upon the application.

Finally, the searched for output impedance H bridge write driver settings are programmed into the lookup table ROM using the associated input codes as ROM addresses. The table values are ordered to be selectable by the appropriate SS<4:0>, OS<2:0>, and PS<1:0> lookup table input address. Note that the steady state SS settings are determined by the user. SS settings are selected so the magnetic field strength produced by the head is strong enough to invert the media during a write operation. Less than all the SS<4:0> signals may be used, as shown in FIG. 1B where SS<4:2> settings 142 are used.

Figure 6A:
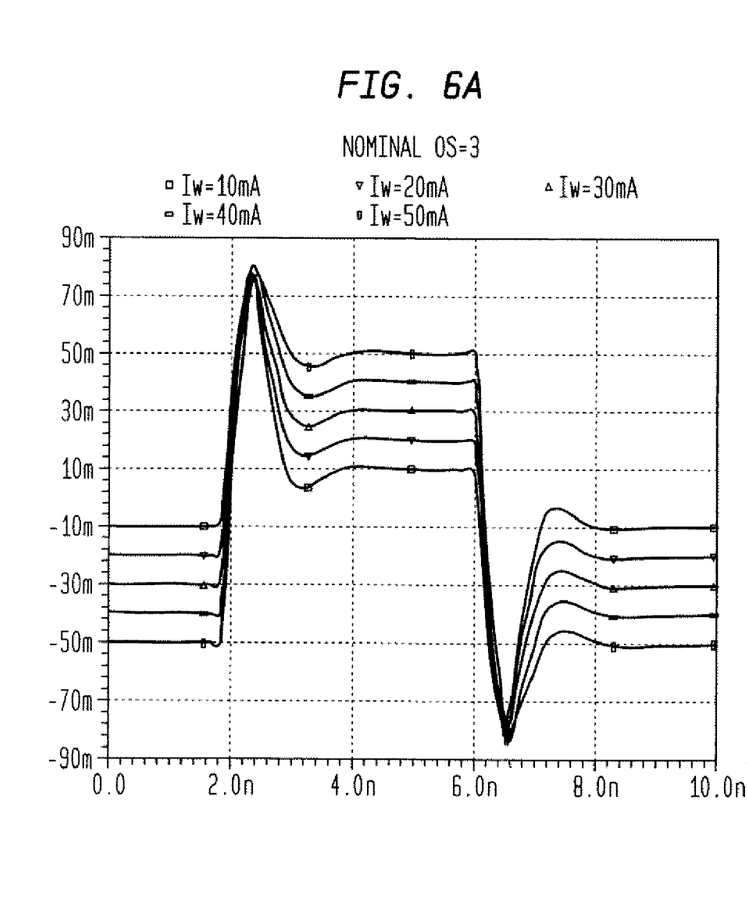
FIGS. 6A and 6B illustrate write current waveforms for sweeping SS values while holding the OS<2:0> signals constant and utilizing a ROM lookup table that targets the overshoot current to be independent of the steady state current in accordance with the present invention.
Figure 6B:
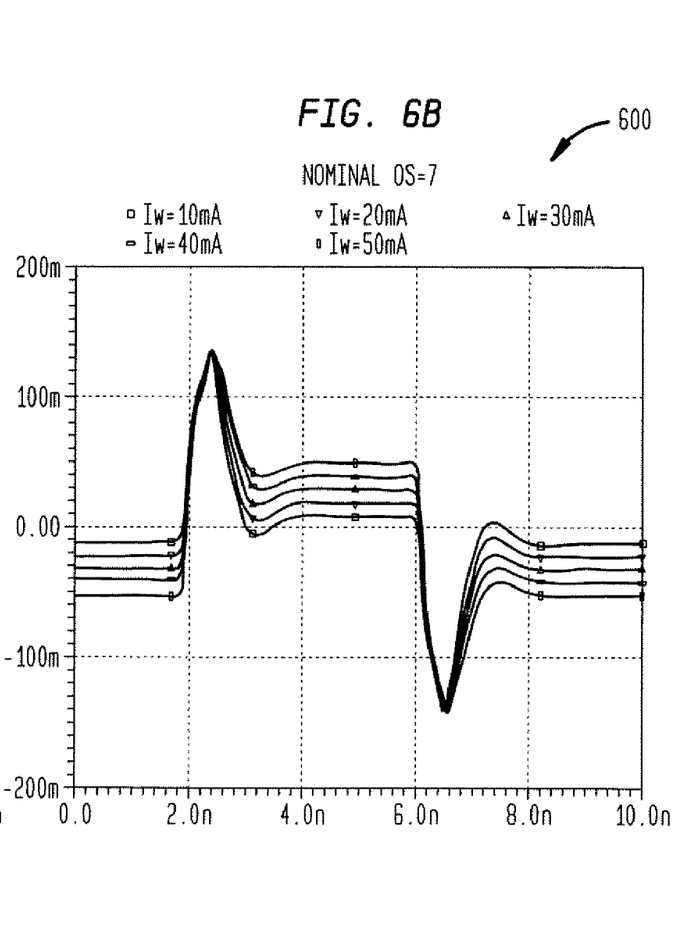

FIGS. 6A and 6B illustrate write current waveforms for sweeping SS values while holding the OS<2:0> signals constant and utilizing a ROM lookup table that targets the overshoot current to be independent of the steady state current. An example equation for steady state current $Iw_{ss}$ is: $Iw_{ss}$=10+ SS<4:0>*1.61 mA which covers the range of stead state current illustrated in FIGS. 6A and 6B.

FIG. 6A illustrates five curves with a low fixed overshoot (OS) setting of OS<2:0>=3=<011> and FIG. 6B illustrates five curves with a high fixed OS setting of OS<2:0>=7=<111>. These curves were measured with a nominal process chip, at a nominal temperature, and nominal power supply voltage. The desired peak current value for each OS setting is picked to be independent of the SS value. For a given OS setting, the peak current should remain constant for different SS settings.

There are several alternative ways to change the peak overshoot current value through the write head. Until this point, the discussion has been focused on a circuit and method that changes the launch voltage provided by the preamp by changing the output impedance of the driver. For example, the OSP<4:0> signals 154 of FIG. 1B, gated by an OSPs timing signal 152, are connected to the OSP switches 230-234 and 245-249. The OSN<4:0> signals 155 of FIG. 1, gated by an OSNs timing signal 153, are connected to the OSN switches 235-244. The OSP switches and OSN switches control the impedance of the output driver during overshoot mode.

Another programmability option changes the overshoot peak current value by changing the time duration that the preamp remains in overshoot mode. The longer the preamp remains in overshoot mode, the larger the peak current value will become. This approach can be conceptually understood by looking at FIG. 4. Changing an overshoot duration (OSD) setting changes the time duration that the gating signals OSPs 408, OSNs 416 and nHZ 424 remain asserted after a WP 404 transition, thereby changing the overshoot time period 430 and affecting the SSPs signal 412 and SSNs 420 signal accordingly.

Figure 7:
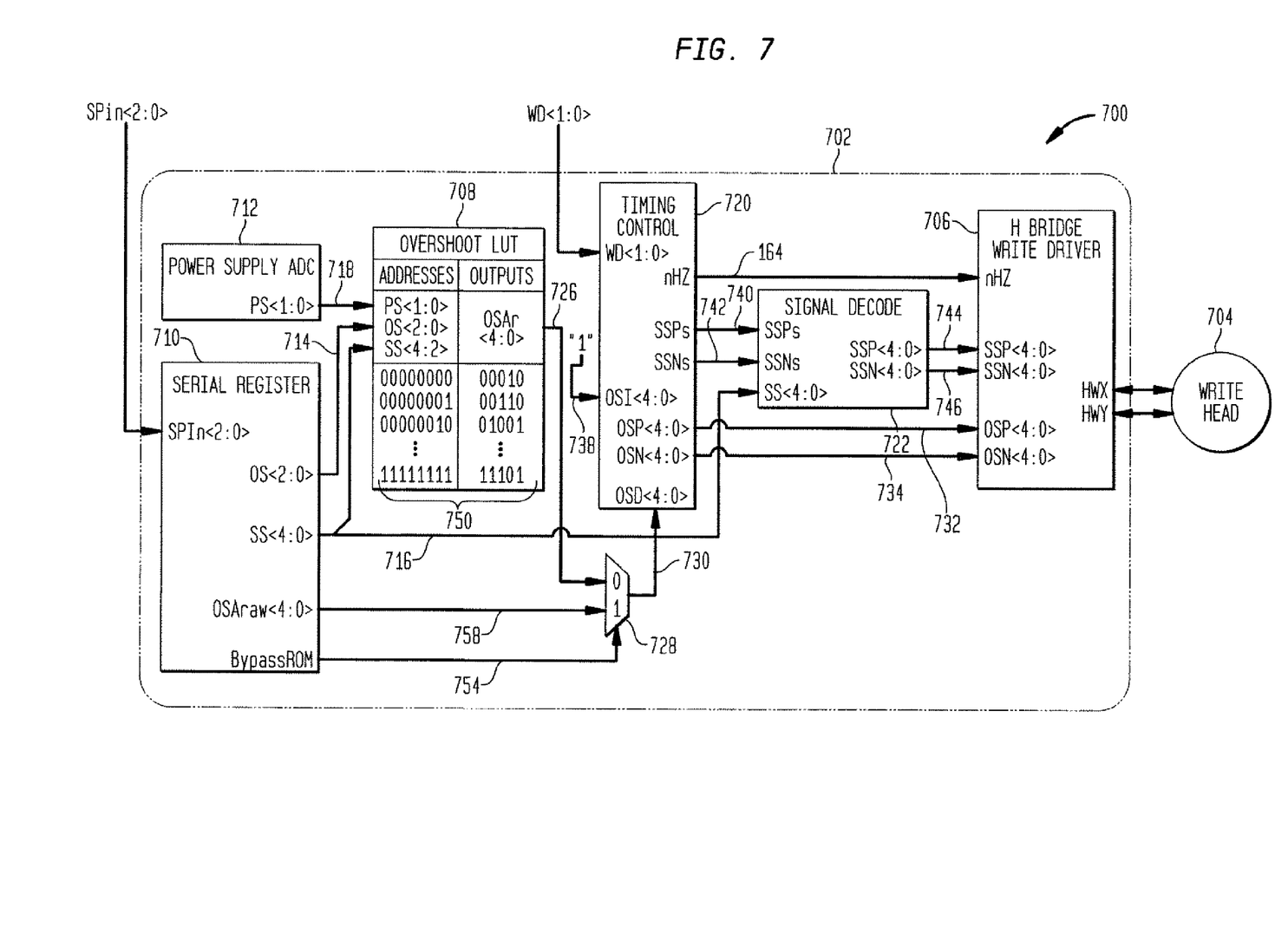
FIG. 7 illustrates a preamp control system with a preamp write subsystem connected to an inductive write head to control overshoot by using programmable pulse duration settings in accordance with the present invention.

FIG. 7 illustrates a preamp control system 700 with a preamp write subsystem 702 connected to an inductive write head 704 to control overshoot by using programmable pulse duration settings. The preamp write subsystem 702 digitally controls the overshoot characteristics of an H bridge write driver 706 based on selectable empirically derived settings stored in a read only memory (ROM) overshoot look up table (LUT) 708.

The preamp write subsystem 702, for the purposes of describing the invention, includes a serial register 710, an HDD power supply analog digital converter (ADC) 712, the overshoot read only memory (ROM) 708, timing control circuit 720, signal decode unit 722, and the H bridge write driver 706. The overshoot LUT 708 stores a look up table and produces digital outputs utilized for controlling pulse duration to achieve a desired overshoot characteristic for each combination of variables. The variables include programmed digital overshoot OS<2:0> signals 714, programmed digital steady state (SS<4:0>) signals 716, and a digital representation of the power supply voltage (PS<1:0>) signals 718.

For the purposes of the illustrative embodiment, the overshoot LUT outputs 726 are selected by multiplexer 728 which outputs OSD<4:0> signals 730 as inputs to the timing control circuit 720. The values stored in the overshoot LUT are chosen based on one setting of OSI<4:0> signals 738. For example, the five OSI<4:0> signals 738 are set to all be active high signals. The OSI<4:0> signals 738 are gated by programmable duration pulses to create the OSP<4:0> signals 732 and OSN<4:0> signals 734. The timing control generates the OSP<4:0> signals 732 and the OSN<4:0> signals 734 under programmable control, as determined by a duration delay equation, for example, $Tos_{duration}$=300 picoseconds+ OSD<4:0>*25 picoseconds which provides a range of 300 picoseconds to 1.075 nanoseconds in 25 picosecond steps. The 5-bit steady state SS<4:0> signals 716 are sent to the signal decode unit 722 and gated by the SSPs signal 740 and SSNs signal 742 as previously described to generate SSP<4:0> signals 744 and SSN<4:0> signals 746.

Figure 8:
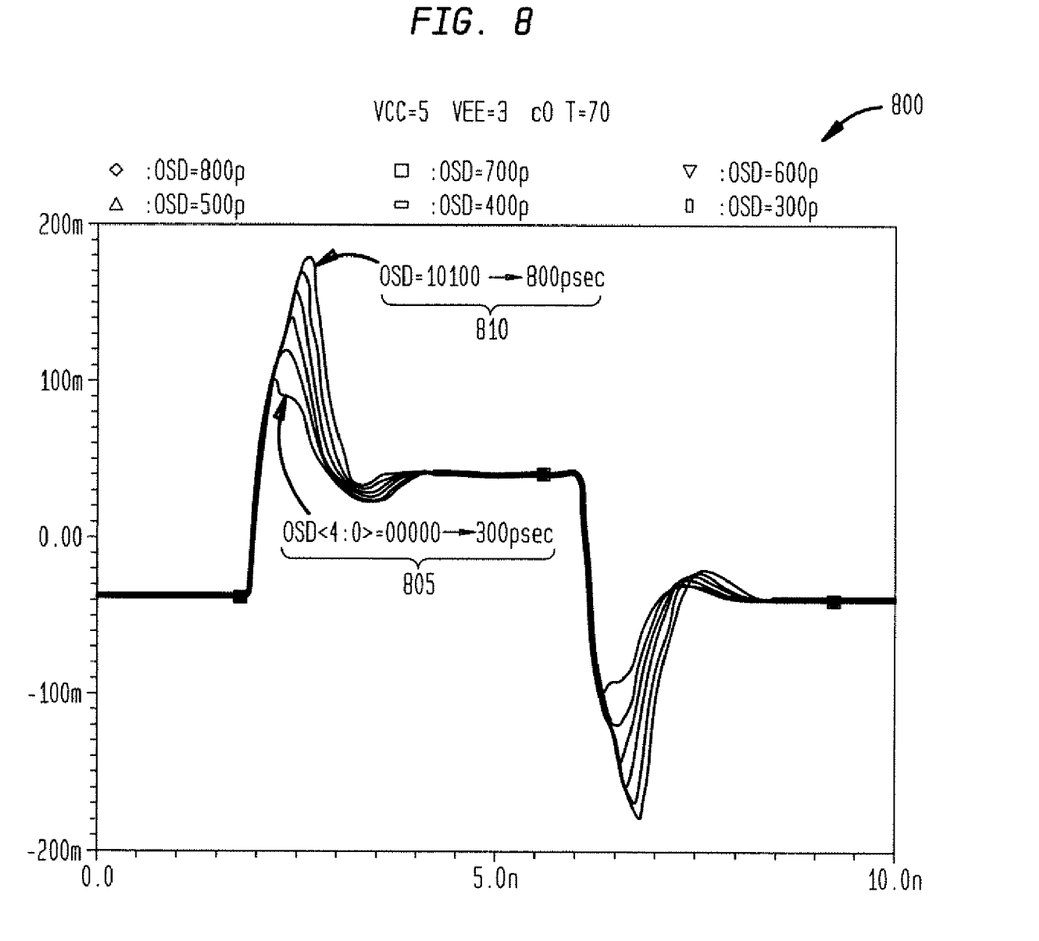
FIG. 8 illustrates the affects of changing overshoot duration (OSD) settings on the write current waveform in accordance with the present invention.

FIG. 8 illustrates the affects of changing overshoot duration (OSD) settings on the write current waveform. FIG. 8 shows an OSD sweep across different OSD settings of 300 picoseconds 805 to 800 picoseconds 810 for a fixed output impedance setting. This is in contrast to FIGS. 5A, 5B, and 5C which show output impedance sweeps for a fixed duration time period of the OSP and OSN signals. The ROM lookup table 708 is loaded with OSD values 750 instead of OSA settings and the lookup table output OSAr<4:0> signals 726 are used to control the duration of the write driver control signals instead of output impedance in order to achieve the desired peak current. The OSD values 750 programmed into the ROM lookup table 708 are derived empirically by evaluating sweeps of OSD values for each of the SS<4:0> signals 716 and PS<1:0> signals 718 settings. The sweeps of OSD values are obtained by bypassing the ROM lookup table 708 with bypass ROM signal 754 and digitally varying the OSAraw<4:0> signals 758. One of a number of benefits of using this programmable pulse duration approach is that the initial part of the waveform after the WP transition will always be the same, independent of the desired peak current value.

It is noted that, generally, the steady state current Iw will inversely affect the peak current, Ip. A lookup table can be used to set the impedance of the output driver based on the Iw and OSP and OSN signals in order to achieve a desired relationship between the overshoot peak and steady state Iw, where the relationship may be proportional, orthogonal, independent, or have some other desired relationship.

While the present invention has been disclosed in a presently preferred context, it will be recognized that the present teachings may be adapted to a variety of contexts consistent with this disclosure and the claims that follow.

For example, while the present invention specifically addresses the conversion of a power supply voltage into a digital representation as a dynamic component of an address for a lookup table of control values, other system variables may be envisioned to be used in a similar capacity. Temperature, process variations that affect overshoot current, particulate contamination level, and wear are a few examples of system variables that can affect circuit performance, be measured, and converted to a digital representation. Such digital representations, by use of the techniques of the present invention, can be used as dynamic components of an address for a lookup table of control values. Other such modifications and adaptations to suit a particular design application will be apparent to those of ordinary skill in the art.

We claim:

1. An overshoot current control circuit for controlling the overshoot current in a write drivers the circuit comprising:
   an addressable lookup table storing overshoot control values, the addressable lookup table employing addresses made up of a dynamic address portion and a static address portion, an address selecting an associated overshoot control value;
   the write driver selectively controlling the write driver overshoot current in response to an overshoot control value; and
   a digital representation of a system variable provided as an input to the addressable lookup table to provide the dynamic address portion.

2. The overshoot current control circuit of claim 1 wherein the write driver comprises a plurality of write driver overshoot control switches which are selectively controlled by the overshoot control value to vary write driver impedance.

3. The overshoot current control circuit of claim 1 further comprising:
   an analog to digital converter that converts an analog system variable to said digital representation of the system variable.

4. The overshoot current control circuit of claim 1 wherein the system variable is a write driver power supply voltage.

5. The overshoot current control circuit of claim 1 wherein the write driver comprises a plurality of write driver overshoot control switches which are selectively enabled for a duration controlled by the overshoot control value to vary the overshoot current.

6. The overshoot current control circuit of claim 1 further comprising:
   a register whose contents are loadable under program control, the register contents containing digital steady state signals, a portion of the digital steady state signals being provided as an input to the addressable lookup table to provide the static address portion.

7. The overshoot current control circuit of claim 6 wherein the write driver comprises a plurality of write driver steady state control switches which are selectively controlled by the digital steady state signals to vary write driver steady state current.

8. The overshoot current control circuit of claim 1 wherein the write driver is an H bridge write driver with positive overshoot control switches and with negative overshoot control switches, the positive overshoot control switches and the negative overshoot control switches being selectively controlled by the overshoot control value to vary write driver impedance.

9. The overshoot current control circuit of claim 1 further comprising:
   a means for bypassing the addressable lookup table; and
   a means for providing programmable overshoot control values for selectively controlling the write driver overshoot current.

10. A hard disk drive (HDD) overshoot current control circuit for controlling the overshoot current in an HDD write driver, the circuit comprising:
    an addressable lookup table storing overshoot control values, the addressable lookup table employing addresses made up of a dynamic address portion and a static address portion, an address selecting an associated overshoot control value;
    the HDD write driver selectively controlling the write driver overshoot current in response to an overshoot control value; and
    a digital representation of an HDD system variable provided as an input to the addressable lookup table to provide the dynamic address portion.

11. The HDD overshoot current control circuit of claim 10 wherein the HDD write driver comprises a plurality of HDD write driver overshoot control switches which are selectively controlled during an overshoot time period by the overshoot control value to vary write driver impedance.

12. The HDD overshoot current control circuit of claim 10 further comprising:
    an analog to digital converter that converts an HDD analog system variable to said digital representation of the HDD system variable.

13. The HDD overshoot current control circuit of claim 10 wherein the HDD system variable is an HDD write driver power supply voltage.

14. The HDD overshoot current control circuit of claim 10 wherein the HDD write driver further comprises a plurality of HDD write driver overshoot control switches which are selectively enabled for a duration controlled by the overshoot control value to vary the overshoot current.

15. The HDD overshoot current control circuit of claim 10 further comprising:
    a register whose contents are loadable under program control, the register contents containing digital HDD steady state signals, a portion of the digital HDD steady state signals are provided as an input to the addressable lookup table to provide the static address portion.

16. The HDD overshoot current control circuit of claim 15 wherein the HDD write driver comprises a plurality of HDD write driver steady state control switches which are selectively controlled during a steady state time period by the digital steady state signals to vary HDD write driver steady state current.

17. The HDD overshoot current control circuit of claim 10 wherein the overshoot control values are obtained by empirically measuring overshoot write current for numerous digital representations of the HDD system variable and numerous steady state current settings, selecting the settings with the overshoot write current closest to a desired overshoot write current as overshoot control values.

18. A method for controlling overshoot current in a write driver, the method comprising:
    supplying a first set of program controlled values;
    supplying a dynamic digital representation of a write driver power supply voltage;

storing digital overshoot control values in a lookup table;
supplying the first set of program controlled values and the dynamic digital representation of the write driver power supply voltage as an address to select a digital overshoot control value in the lookup table; and
controlling overshoot control switches in the write driver in response to the selected digital overshoot control value to control the overshoot current of the write driver.

19. The method of claim 18 further comprising:
receiving a write driver power supply voltage in an analog digital converter; and
generating the dynamic digital representation of the write driver power supply voltage.

20. The method of claim 18 wherein the step of supplying the program controlled set of values further comprises:
supplying a second set of program controlled values;
combining the first set of program controlled values with the second set of program controlled values; and
supplying the combined program controlled set of values to the write driver to control the steady state current in the write driver.

* * * * *